United States Patent
Olsen et al.

(10) Patent No.: US 7,223,091 B2
(45) Date of Patent: May 29, 2007

(54) MOULD ASSEMBLY WITH CLOSURE MECHANISM

(75) Inventors: Søren Malcho Olsen, Bjert (DK); Freddie Reymond Jensen, Aabenraa (DK); Peter Klindt, Vojens (DK); Axel Liebmann, Vejle Ø (DK)

(73) Assignee: LM Glasfiber A/S, Lunderskov (DK)

( * ) Notice: Subject to any disclaimer, the term of this patent is extended or adjusted under 35 U.S.C. 154(b) by 0 days.

(21) Appl. No.: 10/535,018

(22) PCT Filed: Nov. 12, 2003

(86) PCT No.: PCT/DK03/00777

§ 371 (c)(1),
(2), (4) Date: May 12, 2005

(87) PCT Pub. No.: WO2004/043679

PCT Pub. Date: May 27, 2004

(65) Prior Publication Data

US 2006/0034971 A1    Feb. 16, 2006

(30) Foreign Application Priority Data

Nov. 12, 2002   (DK) ............................ 2002 01743

(51) Int. Cl.
*B29C 33/20* (2006.01)
(52) U.S. Cl. .................... 425/450.1; 264/319; 264/334; 425/409; 425/451.9
(58) Field of Classification Search ................ 425/409, 425/450.1, 451.9; 264/319, 334
See application file for complete search history.

(56) References Cited

U.S. PATENT DOCUMENTS

| | | | | |
|---|---|---|---|---|
| 3,161,911 A | * | 12/1964 | Mathews | ................... 425/470 |
| 3,840,317 A | | 10/1974 | Koche et al. | ............... 425/450 |
| 3,981,671 A | * | 9/1976 | Edwards | .................. 425/450.1 |
| 4,080,145 A | | 3/1978 | Jung | ....................... 425/451.5 |
| 4,191,523 A | * | 3/1980 | Niederst et al. | ......... 425/450.1 |
| 4,337,026 A | * | 6/1982 | Taubenmann et al. | ... 425/451.9 |
| 5,282,732 A | * | 2/1994 | Eggert | ........................ 425/153 |
| 5,362,225 A | * | 11/1994 | Kitano et al. | ............ 425/450.1 |
| 6,113,382 A | * | 9/2000 | McNally | .................... 425/409 |

FOREIGN PATENT DOCUMENTS

| | | |
|---|---|---|
| DK | 171 948 B | 5/1996 |
| DK | PA 2000 01281 | 3/2002 |
| EP | 0 037 987 A | 10/1981 |
| EP | 0 159 485 A | 10/1985 |
| GB | 2 119 303 A | 11/1983 |
| WO | WO 99/67079 A | 12/1999 |

* cited by examiner

*Primary Examiner*—James P. Mackey
(74) *Attorney, Agent, or Firm*—Cooper & Dunham LLP

(57) ABSTRACT

A mould assembly includes a first mould part (2) and a second mould part (4) for moulding a wind turbine blade of fibre-reinforced polymer. The assembly has a hinge mechanism (6) with a hinge line (7) extending parallel to the two mould parts in the longitudinal direction of the mould to allow turning of the mould parts in relation to each other between an open position and a closed position. It also has a displacement mechanism for a rectilinear translational movement of the second mould part (4) between a partially closed position and a completely closed position. The displacement mechanism has guide rods (8) including drives for displacing them and thus for moving the two mould parts between the partially closed and completely closed positions.

20 Claims, 4 Drawing Sheets

MOULD ASSEMBLY WITH CLOSURE MECHANISM

TECHNICAL FIELD

The invention relates to a mould assembly and the use of such a mould assembly.

BACKGROUND ART

It is commonly known that moulds for making large articles such as wind turbine blades and consisting of two mould parts are closed about a longitudinal hinge line, where the hinges are passive, ie a crane is used to lift one of the mould parts about the hinge line for closure and opening of the mould. When making wind turbine blades, the mould is closed so as to glue two blade shell halves together, said shell halves being produced in separate mould parts.

Danish patent application No DK 2000 01281 discloses an assembly, a drive unit built into the hinge structure lifting and turning a mould part from a position, in which its opening faces upwards, to a position above the other mould part, in which the openings of the two mould parts face each other. The closure mechanism includes an additional means bringing the two mould parts together by means of a parallel linkage mechanism and almost rectilinear movement. This curve linear or almost rectilinear closing movement is necessary when making wind turbine blades, a complete closure at rotation being geometrically impossible unless the hinge axis is arranged at a disadvantageously large distance from the mould cavity.

However, this known solution is encumbered by certain shortcomings with a view to obtaining an accurate and precise positioning of the mould parts and thus of the blade shells one above the other. The reason why is basically the size of the mould assembly and consequently its bulkiness. In order to obtain an accurate positioning of the upper mould part, the closure mechanism according to the above patent application has to be made with such large dimensions so as to avoid slack and elastic deflections that its mere physical size makes it impractical. It is also desirable to perform various manoeuvres with the upper mould part during the closing or the opening of the mould assembly, said manoeuvres not being possible by means of the known solution.

BRIEF DESCRIPTION OF THE INVENTION

The object of the invention is to provide a mould assembly allowing a simple, fast and accurate closure and opening of the mould parts. A further object is to improve the demoulding process.

According to the invention, the assembly is characterised in that the displacement means are formed of protractile guide rods mounted on one of the two mould parts along the two longitudinal sides thereof extending substantially parallel to the hinge line and associated bearing means provided on the longitudinal sides of the other mould part for receiving the free ends of the guide rods such that the second mould part may rest on the guide rods in the second position of the mould, the guide rods including drive means for displacing the guide rods and thus moving the two mould parts between the second and third positions of the mould. A very accurate closing of the two mould parts is thereby obtained in a rectilinear movement. When operating with large mould parts, which are closed exclusively by means of a hinge mechanism, the dead load of the mould parts causes heavy torques and thus elastic deformations, which in turn result in slack and an inaccurate closing, unless the mould parts and the hinge mechanism are disproportionately heavily dimensioned. According to the invention this drawback is avoided by means of the protractile guide rods and the associated bearings arranged along the two longitudinal sides. Furthermore the risk of so-called "overbite" or "reversed overbite" of the two mould parts in the areas, where the outer edges are not placed precisely opposite each other, is significantly reduced.

According to the invention the guide rods may be provided with individually controllable drive means. As a result the extended length of the guide rods may be adapted to the geometry of the mould parts, whereby contact with the adhesive surfaces is ensured simultaneously in the entire length of the blade. This is highly advantageous in that the slightest contact between the mould parts prior to the final positioning often causes the applied adhesive to be partially scraped off.

According to an advantageous embodiment the free ends of the guide rods and optionally also the bearings are conical. An enhanced control is thereby obtained. In case of a small eccentric displacement from the centre of the bearings, the guide rods are guided into the bearings due to their conical shape.

According to yet an advantageous embodiment the second mould part may be releasably attached to the hinge mechanism so as to be moved from the second partially closed position to the third position by means of the guide rods without being affected by the hinge mechanism, whereby the accuracies are additionally enhanced.

According to an embodiment along their longitudinal sides the mould parts may be provided with flanges having a plurality of pilot holes, the axes of which being parallel to the axes of the guide rods and each pilot hole in the flanges of the first mould part being arranged opposite a pilot hole in the flanges of the second mould part. Enhanced control of the final closing process is thereby obtained in that a short guide pin, which is made to engage the two pilot holes arranged opposite one another, ensures a completely accurate positioning of the two mould parts in relative to each other.

According to an advantageous embodiment the assembly includes guide pins having two conical ends and adapted to engage two pilot holes arranged opposite one another in the flanges of the first and the second mould parts, respectively. This is a particularly simple and practical embodiment, the conical ends contributing to guiding the guide pins into engagement with two holes so as to ensure a reliable and accurate closing.

According to an advantageous embodiment the pilot holes are provided in apertured members, which are adjustably mounted on the flanges to allow displaceable adjustment thereof in the plane extending perpendicular to the axes of the pilot holes. As a result the position of the pilot holes may be adjusted to compensate for any inaccuracies, whereby a perfect final closing of the two mould parts is obtained.

According to a preferred embodiment the apertured members are shaped as circular discs each having an eccentric pilot hole. It is possible to adjust the position of the pilot hole simply by loosening the apertured member and rotating this, until it adopts a correct position, whereafter the apertured member is re-tightened.

The invention further relates to a method of using a mould assembly according to the invention, by which method the second mould part is rotated by means of the hinge mechanism from the first open position to the second partially closed position, and then displaced by means of the guide rods from the second partially closed position to the third position, in which the two mould parts meet.

According to an embodiment of the method the second mould part may subsequently be displaced by means of the guide rods from the third closed position to the second partially closed position.

According to a particularly advantageous embodiment of the method according to the invention the guide rods are operated such that the second mould part is moved from the third closed position locally, eg at one end thereof, whereafter the remaining part of the second mould part is moved away from the third position. An advantageous slip effect is thus obtained in the second mould part, which in turn facilitates the demoulding of the glued article.

BRIEF DESCRIPTION OF THE DRAWINGS

The invention is explained in greater detail below by means of a preferred embodiment illustrated in the drawing, in which.

PREFERRED EMBODIMENTS

The mould assembly according to the invention is particularly suitable for producing a wind turbine blade, which is made by moulding two blade shell halves in separate mould parts and subsequently gluing the blade shell halves together. The blade shell halves per se are typically made by vacuum infusion, in which evenly distributed fibres, rovings, which are fibre bundles, bands of rovings or mats, which may be felt mats of single-fibres or woven mats of fibre rovings, are layered in a mould part and covered by a vacuum bag. By creating vacuum in the cavity between the inner face of the mould part and the vacuum bag, fluid polymer may be sucked into and fill the cavity containing the fibre material. When the polymer has cured, the vacuum bag is removed, and the two blade shell halves may be glued together along the edges and by means of one or more bracings extending in the longitudinal direction of the blade between the inner faces of the two blade shell halves. The joining of the blade shell halves is effected by adhering one or more bracings, flanges and the like to the blade shell half in one mould part, then providing the joining faces with glue and subsequently placing the mould part with the other blade shell half on top of the first mould part.

Figure 1:
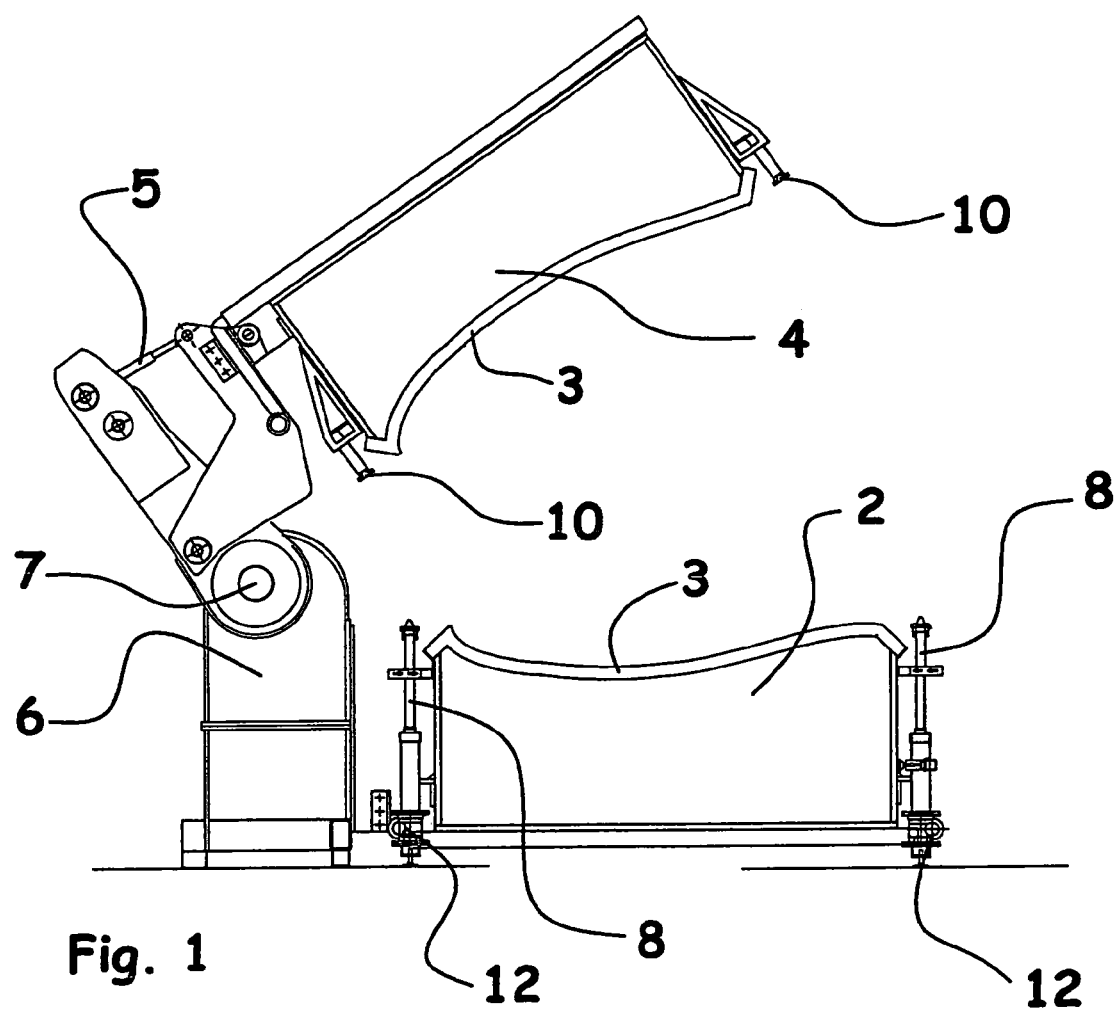
FIG. 1 is cross-sectional view through a mould assembly including first and second mould parts for a wind turbine blade seen during closure of the mould assembly.

FIG. 1 is cross-sectional view through a mould assembly for a wind turbine blade during closure of the mould assembly. The mould assembly includes a first mould part 2, a second mould part 4 and a hinge mechanism 6, which enables turning of the second mould part 4 in relation to the first mould part 2. The blade shell halves 3 are moulded in the two mould parts in a first (not-shown) position of the mould assembly, in which the second mould part 4 is turned 180° in relation to the first mould part 2 such that the openings of both mould parts face upwards. Along its longitudinal sides, which extend parallel to the hinge line 7, the first mould part 2 is provided with a number of protractile guide rods 8 being shown in FIG. 1 in a not yet activated, retracted position. Drive means 12 are provided at a lower end of the protractile guide rods by means of which the guide rods 8 may be protracted and retracted. The hinge mechanism 6 is here shown as a separate unit attached to the two mould parts 2, 4 and includes not-shown drive means for turning the two mould parts in relation to each other. The portion of the hinge mechanism 6 rotating the second mould part 4 is provided with movable elements 5 to enable an accurate positioning of the second mould part 4 above the first mould part 2 and making it possible to compensate for any tolerances when the hinge mechanism is being secured to the mould parts.

Figure 2:
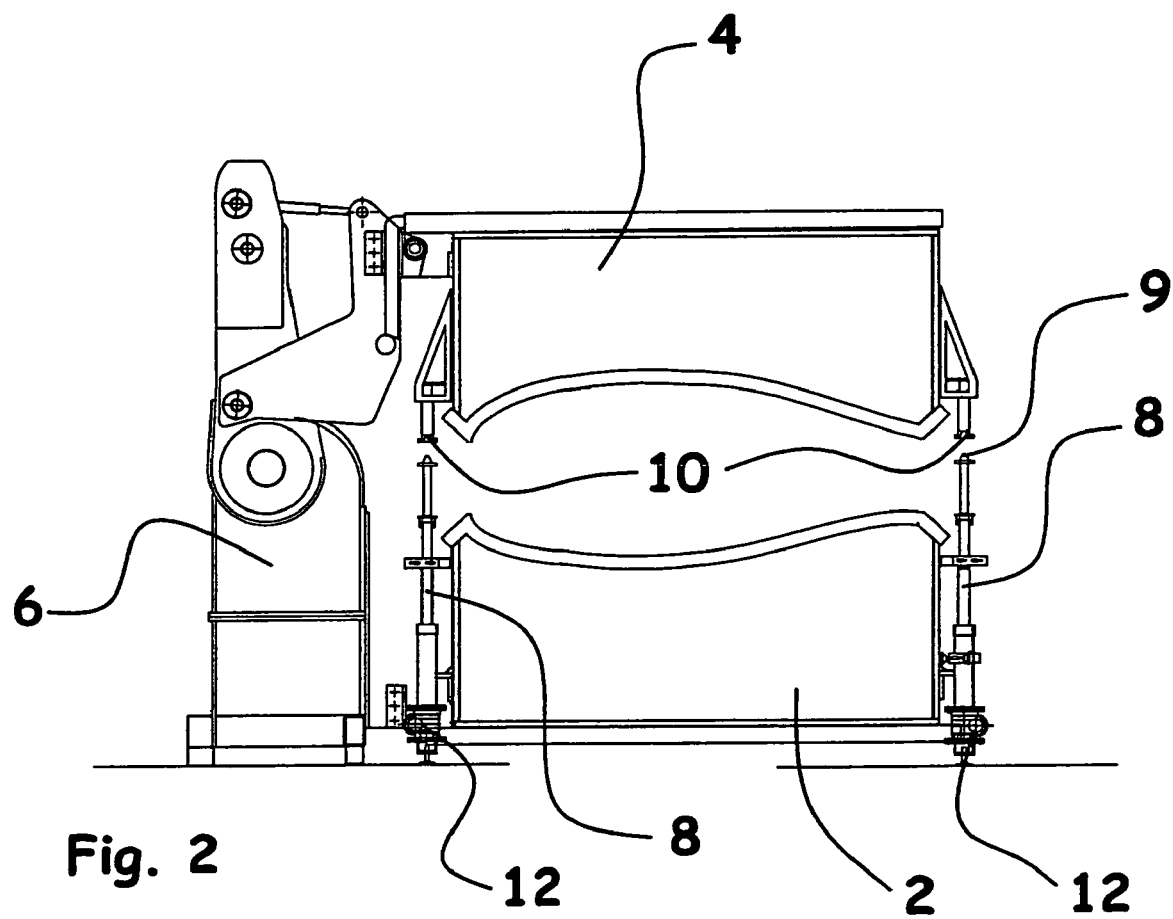
FIG. 2 is a cross-sectional view through the mould assembly, the second mould part being in a second partially closed position above the first mould part.

FIG. 2 illustrates the upper mould part 4 in a second partially closed position, in which it is arranged above the first mould part 2 at a distance—typically 300–500 mm therefrom. The protractile guide rods 8 are moved upwards towards the bearing means 10 mounted on the upper mould part 4 so as to receive the free ends 9 of the guide rods 8. The free ends 9 of the guide rods 8 and the bearing means 10 are conically shaped to guide the ends 9 of the guide rods 8 into reliable engagement with the bearing means 10.

Figure 3:
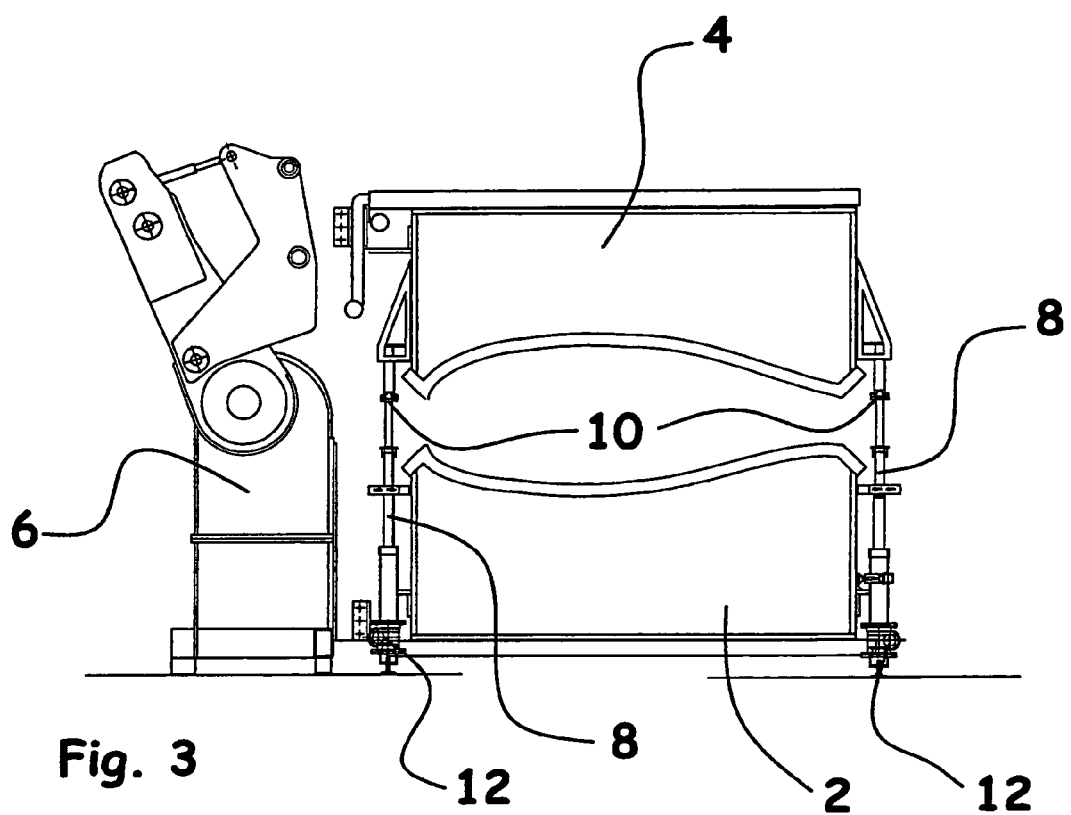
FIG. 3 is a cross-sectional view in which the second mould part is disengaged from the hinge mechanism and rests on the protractile guide rods.

FIG. 3 illustrates the mould assembly in its second partially closed position, in which the upper mould part 4 has been disengaged from the hinge mechanism 6 and now rests exclusively on the protractile guide rods 8. The upper mould part 4 may consequently be guided with an unprecedented high accuracy to a third, not-shown, position, in which the mould parts 2, 4 are made to engage each other along their edges, and in which position the two blade shell halves 3 are glued together. When the glue has either completely or partially cured, the second mould part 4 is lifted again by means of the guide rods 8. In a most advantageous manner the portion of the second mould part 4 in the tip of the wind turbine blade may be lifted first to obtain a slip effect. Naturally, the number and position of the guide rods 8 and associated bearing means 10 depend on the mould length, which may be up to 60 meters or even more. The drive means 12 of the guide rods 8 may be controlled individually to obtain the desired slip effect.

FIGS. 4–8 illustrate additional advantageous details of the mould assembly according to the invention which are not shown in the preceding figures.

Figure 4:
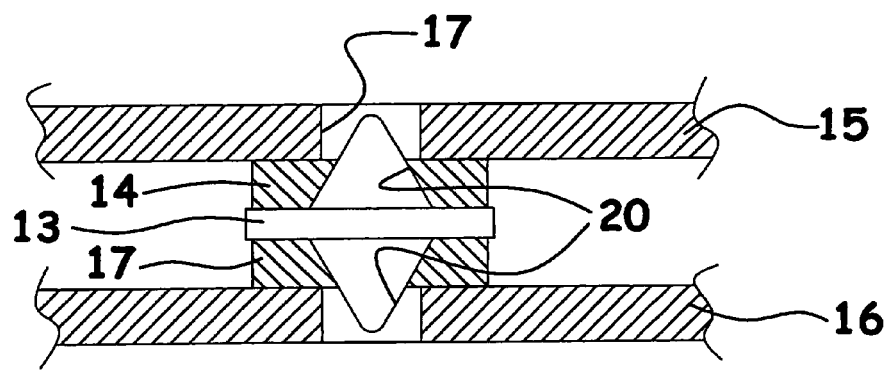
FIG. 4 is a sectional view of a detail of the mould assembly according to the invention, as seen through the flanges on the two mould parts, the apertured members and a guide pin.
Figure 5:
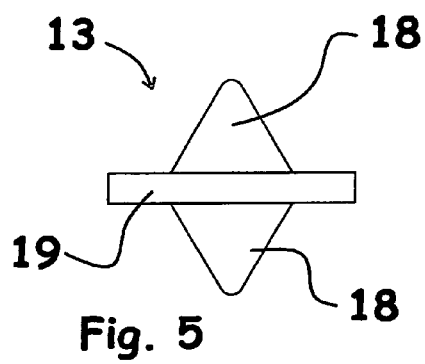
FIG. 5 is a side view of the guide pin.

FIG. 4 is a sectional view through a flange 16 secured to the two longitudinal sides of the first mould part 2 and through a flange 15 secured to the longitudinal sides of the second mould part 4 in the third, closed position of the mould part. Apertured members 14, 17 are secured to the flanges 16, 15, said bodies having conical holes 20, which in FIG. 4 each receives a guide pin 13. As shown in FIG. 5, the guide pin 13 includes two conical ends 18 and a shoulder 19.

Prior to closure of the mould assembly, one conical tip 18 of the guide pin 13 is inserted into the pilot hole 20 of the apertured member 17. When the guide rods 8 bring the second mould part 4 into engagement with the first mould part 2 in the third position, the pilot hole 20 of the apertured member 14 is brought into engagement with the upwardly facing conical end 18 of the guide pin, whereby a very accurate closure of the mould parts is ensured.

Figure 6:
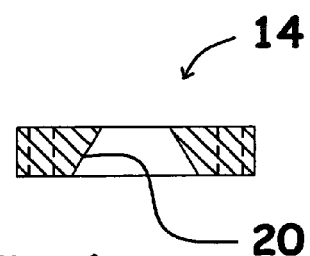
FIG. 6 is a sectional view of the apertured member.

FIG. 6 is a cross-sectional view of the apertured member 14, the conical hole 20 being visible.

Figure 7:
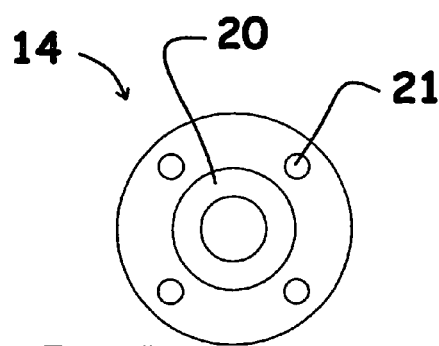
FIG. 7 is an end view of the apertured member.

FIG. 7 is an end view of the apertured member 14 as seen from the end in which the conical pilot hole 20 has the largest diameter. Pin holes 21 serve to secure the apertured member to the flanges 15, 16.

Figure 8:
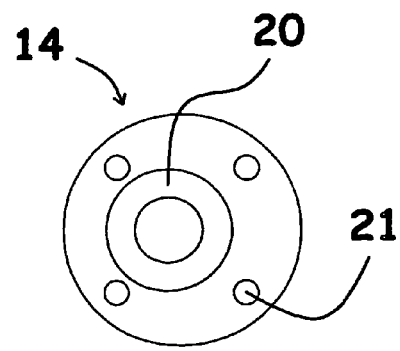
FIG. 8 shows an optional embodiment of the apertured member.

FIG. 8 shows an optional embodiment of the apertured member 14, in which the pilot hole 20 is arranged eccentrically. This apertured member may be mounted in four different positions, whereby the pilot hole 20 can be adjusted in four different positions to compensate for any tolerances. Optionally, the pin holes 21 may be shaped as oblong or circular segment-shaped holes to increase the fine-adjusting options in relation to the position of the pilot hole 20.

The invention is not restricted to the shown embodiment.

The invention claimed is:

1. Mould assembly including a first mould part (2) and a second mould part (4) for moulding a substantially elongated, closed profile member of fibre-reinforced polymer, said mould assembly further including:

a hinge mechanism (6) with a hinge line (7) extending parallel to the two mould parts in the longitudinal direction of the mould to allow turning of the mould parts in relation to each other between a first, open position, in which the opening of at least one of the mould parts faces upwards, and a second, partially closed position, in which the second mould part (4) is rotated about the hinge line (7) such that its opening faces downwards towards the opening of the first mould part (2), the mould assembly further being provided with displacement means for a rectilinear translational movement of the second mould part (4) between the second, partially closed position of the mould and a third position, in which the two mould parts (2, 4) meet so that their inner faces substantially define the shape of the finished profile member characterised in that the displacement means are formed of protractile guide rods (8) mounted on one (2) of the two mould parts along the two longitudinal sides thereof extending substantially parallel to the hinge line (7), and associated bearing means (10) on the longitudinal sides of the other mould part (4) for receiving free ends (9) of the guide rods (8) such that the second mould part (4) may rest on the guide rods in the second position of the mould, the guide rods (8) including drive means (12) for displacing the guide rods (8) and thus moving the two mould parts (2, 4) between the second and third positions of the mould.

2. Mould assembly according to claim 1, wherein the guide rods (8) are provided with individually controllable drive means (12).

3. Mould assembly according to claim 1, wherein the free ends (9) of the guide rods (8) and also the bearing means (10) are conical.

4. Mould assembly according to claim 1, wherein the second mould part (4) is releasably attached to the hinge mechanism (6).

5. Mould assembly according claim 1, wherein both mould parts (2, 4) are provided with flanges (15, 16) along their longitudinal sides, said flanges having a plurality of pilot holes (20), whose axes are parallel to the axes of the guide rods (8), each pilot hole (20) in the flanges (16) of the first mould part (2) being arranged opposite a pilot hole in the flanges (15) of the second mould part (4).

6. Mould assembly according to claim 5 including guide pins (13) having two conical ends (18) adapted to engage two of said pilot holes (20) arranged opposite one another in the flanges (15, 16) of the first mould part (2) and the second mould part (4).

7. Mould assembly according to claim 5, wherein the pilot holes (20) are provided in apertured members (14, 17), which are adjustably mounted on the flanges (15, 16) so as to enable displaceable adjustment thereof in the plane extending perpendicular to the axes of the pilot holes (20).

8. Mould assembly according to claim 7, wherein the apertured members are shaped as circular discs (14, 17) each having an eccentric pilot hole (20).

9. Method of the use of a mould assembly according to claim 1, wherein the second mould part (4) is rotated by means of the hinge mechanism (6) from the first open position to the second partially closed position, and then displaced by means of the guide rods (8) from the second partially closed position to the third position, in which the two mould parts (2, 4) meet.

10. Method according to claim 9, wherein the second mould part (4) subsequently is displaced by means of the guide rods (8) from the third closed position to the second partially closed position.

11. Method according to claim 10, wherein the guide rods (8) are operated such that the second mould part (4) is moved from the third closed position locally, whereafter the remaining part of the second mould part (4) is moved from the third position.

12. Mould assembly according to claim 2, wherein the free ends (9) of the guide rods (8) and also the bearing means (10) are conical.

13. Mould assembly according to claim 2, wherein the second mould part (4) is releasably attached to the hinge mechanism (6).

14. Mould assembly according to claim 3, wherein the second mould part (4) is releasably attached to the hinge mechanism (6).

15. Mould assembly according claim 2, wherein both mould parts (2, 4) are provided with flanges (15, 16) along their longitudinal sides, said flanges having a plurality of pilot holes (20), whose axes are parallel to the axes of the guide rods (8), each pilot hole (20) in the flanges (16) of the first mould part (2) being arranged opposite a pilot hole in the flanges (15) of the second mould part (4).

16. Mould assembly according claim 3, wherein both mould parts (2, 4) are provided with flanges (15, 16) along their longitudinal sides, said flanges having a plurality of pilot holes (20), whose axes are parallel to the axes of the guide rods (8), each pilot hole (20) in the flanges (16) of the first mould part (2) being arranged opposite a pilot hole in the flanges (15) of the second mould part (4).

17. Mould assembly according to claim 6, wherein the pilot holes (20) are provided in apertured members (14, 17), which are adjustably mounted on the flanges (15, 16) so as to enable displaceable adjustment thereof in the plane extending perpendicular to the axes of the pilot holes (20).

18. Method of the use of a mould assembly according to claim 2, wherein the second mould part (4) is rotated by means of the hinge mechanism (6) from the first open position to the second partially closed position, and then displaced by means of the guide rods (8) from the second partially closed position to the third position, in which the two mould parts (2, 4) meet.

19. Method of the use of a mould assembly according to claim 1 wherein said substantially elongated, closed profile member is employed as a wind turbine blade.

20. A mould assembly according to claim 1 wherein in the first, open position the openings of both mould parts face upwards.

* * * * *